United States Patent

Mason et al.

Patent Number: 6,161,187
Date of Patent: Dec. 12, 2000

[54] SKIPPING CLOCK INTERRUPTS DURING SYSTEM INACTIVITY TO REDUCE POWER CONSUMPTION

[75] Inventors: Andrew Halstead Mason, Hollis, N.H.; James Jonathan Delmonico, Clinton; Reinhard Christoph Schumann, Stow, both of Mass.

[73] Assignee: Compaq Computer Corporation, Houston, Tex.

[21] Appl. No.: 09/232,009

[22] Filed: Jan. 14, 1999

Related U.S. Application Data

[63] Continuation of application No. 08/743,377, Nov. 1, 1996, Pat. No. 5,926,640.

[51] Int. Cl.[7] .............................. G06F 1/26; G06F 1/28; G06F 1/30
[52] U.S. Cl. ..................... 713/322; 713/320; 713/324; 326/98
[58] Field of Search .................................. 713/320, 324, 713/322; 326/98

[56] References Cited

U.S. PATENT DOCUMENTS

| 5,222,076 | 6/1993 | Ng et al. | 375/223 |
| 5,335,540 | 8/1994 | Bowler et al. | 73/146.5 |
| 5,530,879 | 6/1996 | Crump et al. | 713/323 |

*Primary Examiner*—Glenn A. Auve
*Assistant Examiner*—Rupal D. Dharia
*Attorney, Agent, or Firm*—Hamilton, Brook, Smith & Reynolds, P.C.

[57] ABSTRACT

A method for reducing power consumption in a computer system is provided wherein the computer system includes a system bus interface connected by a signal line to a power supply and/or clock circuitry for the central processing unit, each having the capability to change the characteristic of its output responsive to the signal line for placing the central processing unit in a low-power consuming state. The system bus interface chip further including a storage location and counter for storing the type and quantity of interrupt assertions during the period of time when the central processing unit is in the low power consuming state.

The system software determines the desired period of time to put the central processing unit into the low-power consuming safe and does not return it to normal power consuming state until the time period has expired, a non interval clock interrupt is asserted, or another critical event occurs that needs immediate CPU attention.

When one of these conditions arises, the signal line changes polarity, the power supply and/or clock circuitry returns normal operating levels to the CPU, and the system bus interface presents all interrupts that asserted while the CPU was in the low-power consuming state to the CPU so it can continue normal operation.

21 Claims, 6 Drawing Sheets

OPERATING SYSTEM LAYER

HARDWARE ABSTRACTION LAYER

PAL LAYER

ACTUAL HARDWARE

FIG. 5

SKIPPING CLOCK INTERRUPTS DURING SYSTEM INACTIVITY TO REDUCE POWER CONSUMPTION

RELATED APPLICATION

This application is a continuation of application Ser. No. 08/743,377, filed Nov. 1, 1996 U.S. Pat. No. 5,926,640, the entire teachings of which are incorporated herein by reference.

BACKGROUND OF THE INVENTION

This invention relates generally to computer systems and more specifically to observing power in computer systems.

As it is known in the art the demand for low power personal computers, referred to as "green systems", has spread to all aspects of the computer market. Accordingly, system designers strive to increase the amount of work a central processor unit (CPU), can perform, while reducing the amount of energy necessary to perform that work.

Low power consumption requirements are most noticeable in the personal computer (PC) market, where portable notebook computers comprise a growing percentage of industry sales. Since these systems run on batteries, new techniques have been developed to increase the duration of operating time between recharges. Further, power consumption methods are required in desktop systems in order to reduce unnecessary energy costs.

Several power conservation techniques currently used in the art include screen savers that completely clear the video screen, timers that shut the system off after specified periods of inactivity, circuits that switch to low voltage and low frequency operation when full computing power is not needed, circuits that spin-down disks when accesses are not imminent, and operating system instructions for informing the CPU that the system is inactive so that it can transition into a low-power consumption mode.

Instructions that inform the CPU of system inactivity are very useful for reducing system power consumption. Historically, these instructions have been used to essentially put the CPU "to sleep" by preventing it from executing instructions during inactive periods. During this sleep period, the CPU can also transition into a low power state by reducing either the voltage, the frequency or both. Accordingly, since the longer a system remains inactive the more its CPU can remain in a low power-consuming state, a portable system can operate for a greater period of time before the batteries require recharging.

One problem that frustrates power saving arises from the assertion of system interrupt signals. Typically, the assertion of a system interrupt forces a CPU to return to a normal power-consuming mode by indicating that a portion of the system is no longer inactive and requires immediate servicing. In order to service the interrupt, the CPU must transition from sleep mode into full power operation and resume executing instructions. Therefore, the assertion of system interrupt signals contributes to increased power consumption.

Some type of system interrupt is used in virtually every computer system as a means for time management operation. Time management operations refer to video screen clock applications, system instructions for software time-out conditions, and for scheduling execution of future CPU and system operations. For example, a typical time management operation is the delay of large computer printouts until after peak usage hours.

One interrupt, used for time management operation in many different system architectures, is the interval clock interrupt. Interval clock interrupts occur at periodic time intervals, for example each millisecond, and are used by the operating system to trigger system action at specified times.

However, interval clock interrupts present a problem for conserving energy in idle systems. Because the interval clock interrupts assert at a frequent periodic rate, the CPU must repeatedly awaken to service these requests. Therefore when every part of the system other than the clock is inactive for a long period of time, the CPU is still required to return from the low power operating mode in order to service the clock interrupt. As described above, the longer a system remains idle and the longer a CPU remains "asleep", the more power it will conserve. Therefore, because interval clock interrupts assert periodically, the effectiveness of being able to put a CPU into a low power-consuming state is severely decreased.

A method is therefore needed for placing a CPU in a low power operating mode for an extended period of time, without having to periodically service interval clock interrupts.

SUMMARY OF THE INVENTION

In accordance with the present invention, a method for decreasing power consumption in a computer system includes the steps of placing the central processing unit in a low power consumption mode, counting assertions of an interval interrupt signal and returning the central processing unit to normal power consumption mode when either the predetermined time period for the central processing unit to operate in the low power consumption mode has expired or when a system interrupt signal, other than the interval interrupt signal is asserted.

With such an arrangement the power consumption of inactive systems is significantly decreased because the central processing unit can remain in the low power consumption mode for an extended period of time since it does not have to service each interval clock interrupt assertion. Accordingly, when the CPU is in the low power consumption mode, the interval clock interrupt assertions are counted. When the central processing unit is returned to the normal power consumption mode, it is updated with the accumulated count and continues to operate as if it had been interrupted for each interval clock interrupt assertion. Therefore the time that the CPU can remain in the low power consumption mode is significantly increased and the amount of power consumed is significantly decreased.

BRIEF DESCRIPTION OF THE DRAWINGS

The foregoing features of this invention, as well as the invention itself, may be more fully understood on the following detailed description when read in conjunction with the accompanying drawings, in that:

FIG. 5 depicts a layered software application capable of running on the computer system of FIG. 1.

DESCRIPTION OF A PREFERRED EMBODIMENT

Figure 1:
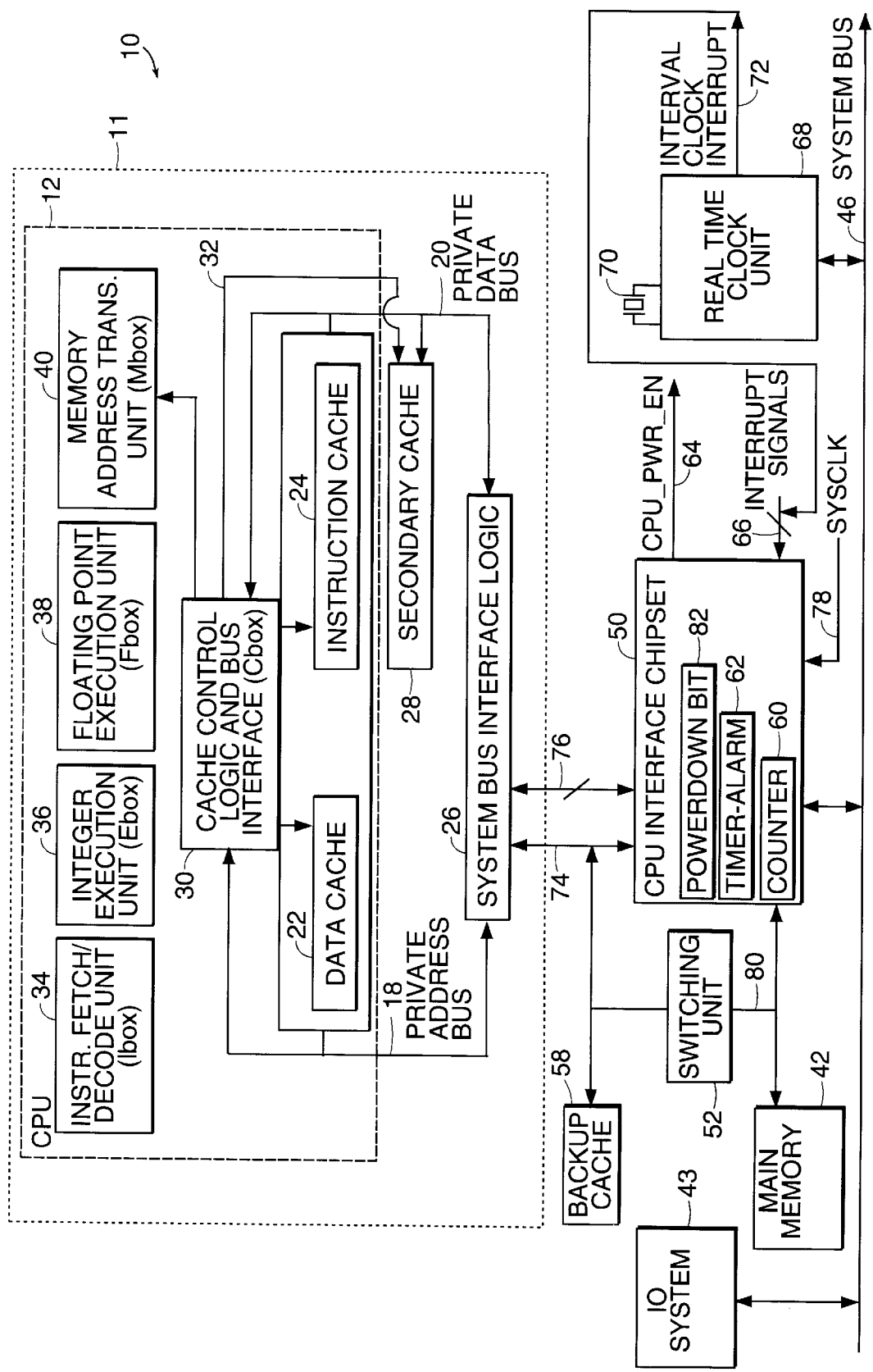
FIG. 1 is a block diagram depicting a computer system including logic used for placing the central processing unit in a low-power consuming mode of operation.

Referring to FIG. 1, a computer system 10 is shown to include a processor module 11 including a central processing unit (CPU) 12. A private address bus 18 and a private data bus 20 within the CPU connects a data cache 22, an instruction cache 24, and a system bus interface 26. The private data bus 20 connects a separate secondary cache 28 to the CPU.

Central processing unit 12 further includes several groups of logic that enable the CPU to execute computer applications, i.e. programs. The Ibox 34, or Instruction Fetch and Decode Unit, controls instruction pre-fetching, instruction decoding, branch prediction, instruction issuance, and interrupt handling. The Ebox 36, or Integer Execution Unit, handles the functions of addition, shifting, byte manipulation, logic operations, and multiplication for integer values stored in the system. These same operations, for floating point values, are controlled by the Fbox 38, or Floating Point Execution Unit. The Mbox 40, or Memory Address Translation Unit, translates dual addresses, generated by the programs running on the system, into physical addresses that are used to access locations in the computer system. Lastly the Cbox 30, or Cache Control and Bus Interface Unit, controls the secondary cache (S Cache) 28 and accesses to the backup cache (B Cache) 58. It also controls the private data bus 20, private address bus 18, memory related external interface functions, and all accesses initiated by the Mbox 40.

For accessing main memory 42, the IO system 43, and other connected system elements, the system bus interface 26 connects the CPU's private address bus 18 and data bus 20 to the CPU Interface Chipset 50. The CPU Interface Chipset 50 buffers the system bus signals along with associated bus control signals before passing them to or form the processor module 11. The CPU Interface Chipset 50 is shown to include a 64-bit counter 60 for counting CPU clock pulses when CPU 12 is in a low-power consuming mode of operation, and a timer-alarm storage location 62 that asserts signal CPU_PWR_EN 64. Signal CPU_PWR_EN is de-asserted to stop CPU 12 from executing instructions in order to place it in a low-power consuming mode of operation, as will be described below.

CPU module 11 is connected to the CPU Interface Chipset 50 by a bus 74 that also provides an unbuffered interface to cache unit 58, allowing CPU 12 to access cached data as quickly as possible. Bus 74 also allows CPU 12 to access switching unit 52 that is comprised of a relatively fast logic path that can be alternatively connected or disconnected from bus 80 to provide CPU access to main memory unit 42. Switching unit 52 therefore allows CPU 12 to transfer data between itself and main memory 42 without incurring the latency that would otherwise be added if its data transfers had to pass through CPU Interface Chipset 50. Other system components coupled to system bus 46 can access main memory 42, however, these transfers must pass through CPU Interface Chipset 50 and incur a timing latency therefrom.

In addition to buffering the signals comprising system bus 46, the CPU Interface Chipset 50 also buffers interrupt signals 66 generated by the relevant system components. The CPU Interface Chipset 50 has logic for counting the number and type of interrupts asserted during periods when the CPU 12 is in a low power-consuming state. Moreover, CPU Interface Chipset 50 includes logic for asserting a signal 64 that is connected to the CPU power supply, frequency generator, or both in order to place the CPU in such a low-power consuming state. The CPU Interface Chipset 50 correctly times and sequences all operations required to bring the processor module in and out of the low-power consuming state.

A Real Time Clock unit 68 is shown coupled to system bus 46 and to a crystal oscillator 70. The Real Time Clock unit 68 includes logic for maintaining a representation of the current time through means for counting electrical pulses output from the attached crystal oscillator device 70. The Real Time Clock unit 68 also asserts an interval clock interrupt 72 at a set periodic rate to enable the operating system to execute time-scheduled system events. The interval clock interrupt assertion rate is usually written by system software into an on-chip storage location at system initialization time. When the interval interrupt signal 72 is asserted, it is input to the CPU Interface Chipset 50 and is subsequently forwarded to the CPU 12 for servicing.

A system such as the one shown in FIG. 1 has interval clock interrupts that assert at a rate of one kilohertz, or rather one assertion per millisecond. The operating system software, running on such a system, uses these interrupts for maintaining a representation of the current time. The current time representation is then used for triggering execution of system actions at specified future times. For example, computer systems typically delay large printing operations until a designated time after normal working hours. These systems therefore use the interval clock interrupts to determine when to execute the print operation.

The interval clock interrupt signal line 72 is connected directly to the CPU Interface Chipset 50 that is further connected to CPU 12 via bus 76. Specifically, the buffered interrupt signal 76, output by CPU Interface Chipset 50, is connected to the instruction fetch and decode unit 34 through system bus interface 26. When the Ibox 34 determines that an interrupt has been asserted, it compares the priority level of the asserted interrupt with the priority levels of all other asserted interrupts and with the central processing unit's operating priority level to determine if the interrupt is at a sufficient level to be serviced. If the central processing units interrupt priority level (IPL) is less than the IPL of the interrupting source, and if the interrupting source has the highest IPL of all asserted interrupts, then the CPU will be interrupted from its present task and the interrupt will be serviced.

Maintaining an accurate time representation using the interval clock interrupt signal 72 is extremely important for system operation and is therefore typically given an interrupt priority level (IPL) that is greater than the IPL of most of the other system components so that it will be successful in interrupting the CPU and therefore serviced quickly. When the interval clock interrupt is serviced, the CPU's internal clock is advanced by the amount of time represented by each interrupt assertion, for example one millisecond.

Figure 2A:
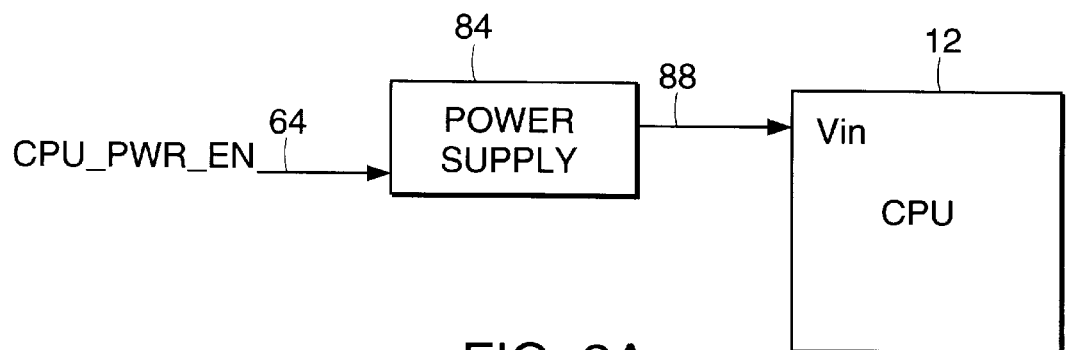
FIGS. 2A, 2B, and 2C are block diagrams of apparatuses for reducing the operating voltage and/or operating frequency of CPU 12 of FIG. 1.
Figure 3:
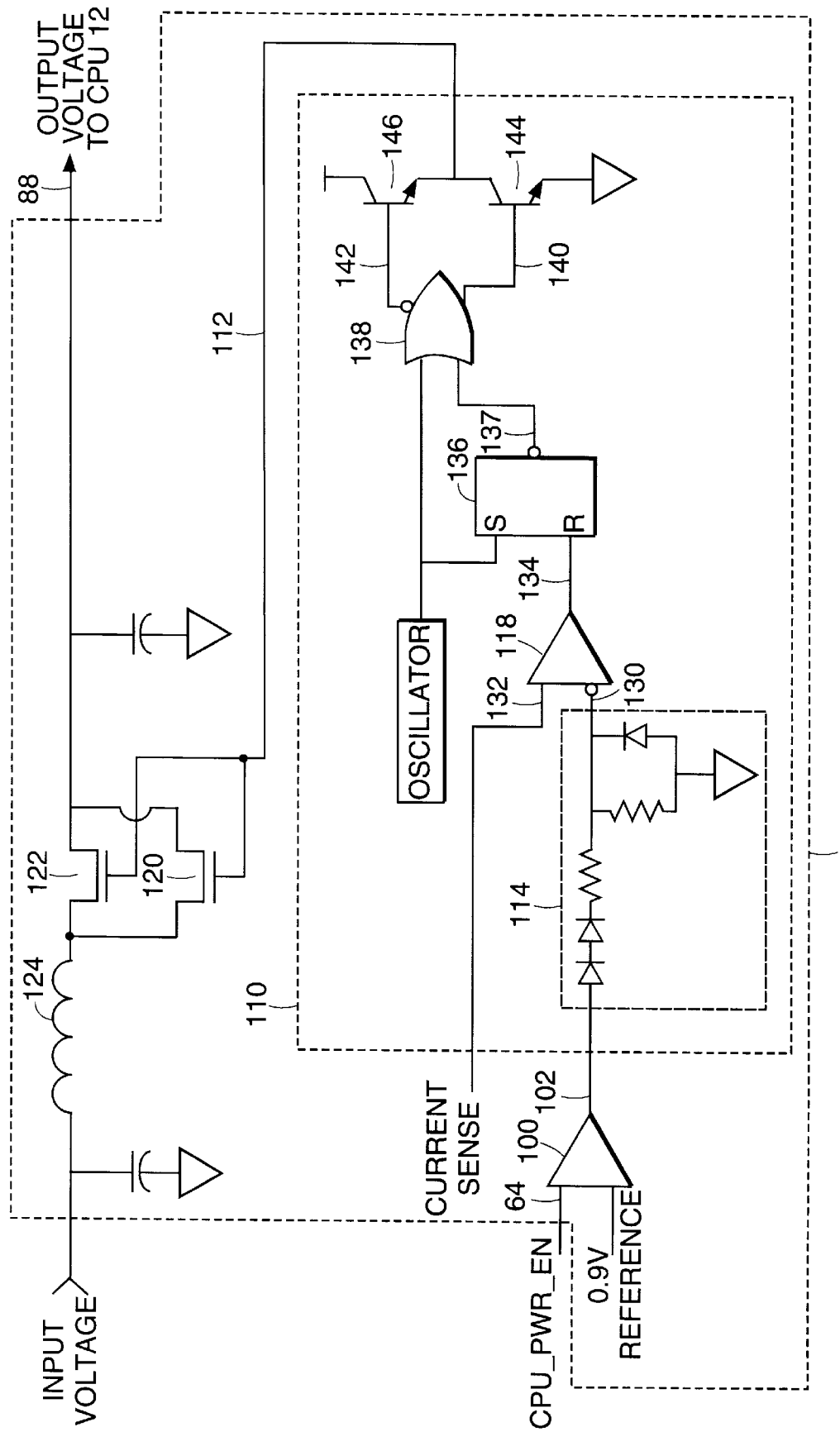
FIG. 3 depicts the internal circuitry of Power Supply 84 of FIG. 2 for reducing its output voltage.

Referring now to FIGS. 2a and 3, signal line CPU_PWR_EN 64 is shown connected to a power supply 84 that includes means for reducing its output voltage to a level sufficient to stop the CPU from executing instructions. FIG. 3 depicts the relevant portion of power supply 84 that varies the output voltage signal 88 responsive to signal line CPI_PWR_EN 64. It should be noted that FIG. 3 omits specific details of power supply 84 that are not necessary for an understanding of the present invention.

Referring to FIG. 3, signal line CPU_PWR_EN 64 is shown coupled to an input of power supply 84, and more specifically to one input of comparator 100. The alternate input of comparator 100 is coupled to a 0.9 volt source. The output 102 of comparator 100 is coupled to the input node of a Unitrode UC3843 pulse width modulation (PWM) controller 110 that produces a pulse width modulated signal 112 coupled to switches 120 and 122. Switches 120 and 122 sample the voltage of the secondary side of transformer 124. The sampled voltage is transferred to filtering logic and finally to the output signal 88.

When the operating system software determines that the CPU 12 should be placed into the low power consumption mode, it de-asserts signal line CPU_PWR_EN 64. When CPU_PWR_EN 64 is de-asserted, the output of comparator 100 presents a low level signal to input 102 of the PWM controller 110. Within PWM controller 110, the low voltage level on input 102 is presented to a diode and resistor circuit 114 which in turn presents it to the low active input 130 of the current sense comparator 118. Typically the current sense input 132 of current sense comparator 118 will be deasserted, and therefore output 134 will assert. The assertion of output signal 134 is conveyed to the reset input of S-R flop 136 that, because of the inverted output configuration, generates a high level output signal 137. Output signal 137 is input to OR gate 138. A high level signal presented to any input of OR gate 138 causes its non-inverted output signal 140 to assert and its inverted output signal 142 to deassert. Accordingly, the assertion of output signal 140 and the deassertion of output signal 142 cause transistor 144 to turn on and transistor 146 to turn off. The result is that output signal 112, from the PWM controller, is turned off and has a value of approximately 0.6 volts.

When output signal 112 is turned off, the low level signal is conveyed to switches 120 and 122, causing them to also turn off. When switches 120 and 122 are turned off, the path from transformer 124 to the output voltage signal 88 is also shut off. Therefore, output signal 88 is no longer driven to the normal operating voltage level and is reduced to approximately 0.7 volts.

It will be recognized by one of ordinary skill in the art that the disclosed embodiment for reducing the output voltage is merely one of many methods for reducing supply voltage to CPU 12. Accordingly this example is not meant to limit the disclosure to this one embodiment but rather to give one example for reducing supply voltage to CPU 12 in response to a control signal.

Accordingly, based upon the functional sequence described above, CPU 12 is placed into a low-power consuming mode responsive to the de-assertion of signal CPU_PWR_EN 64. Although the output voltage of power supply 84 may be effectively reduced to zero, an alternative method is to reduce the voltage to a value greater tan zero that allows the storage locations comprising the CPU to remain valid. Allowing the CPU's storage locations to remain valid avoids a subsequent storage location update operation and the time to re-awaken the CPU is therefore significantly decreased.

Figure 2B:
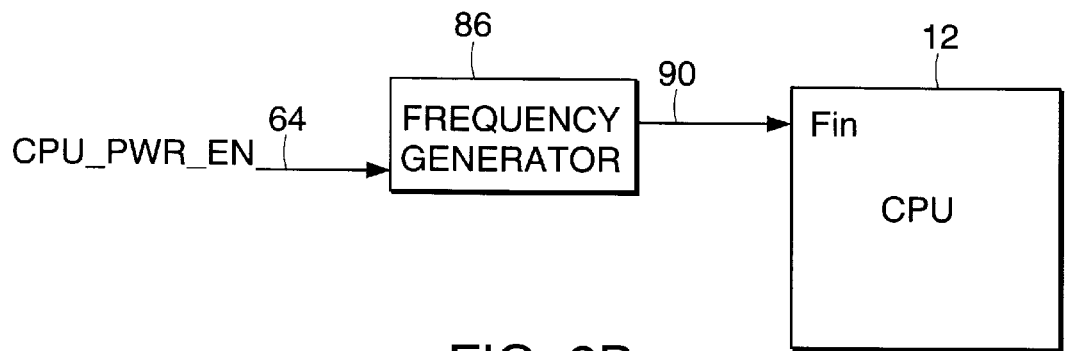
Figure 4:
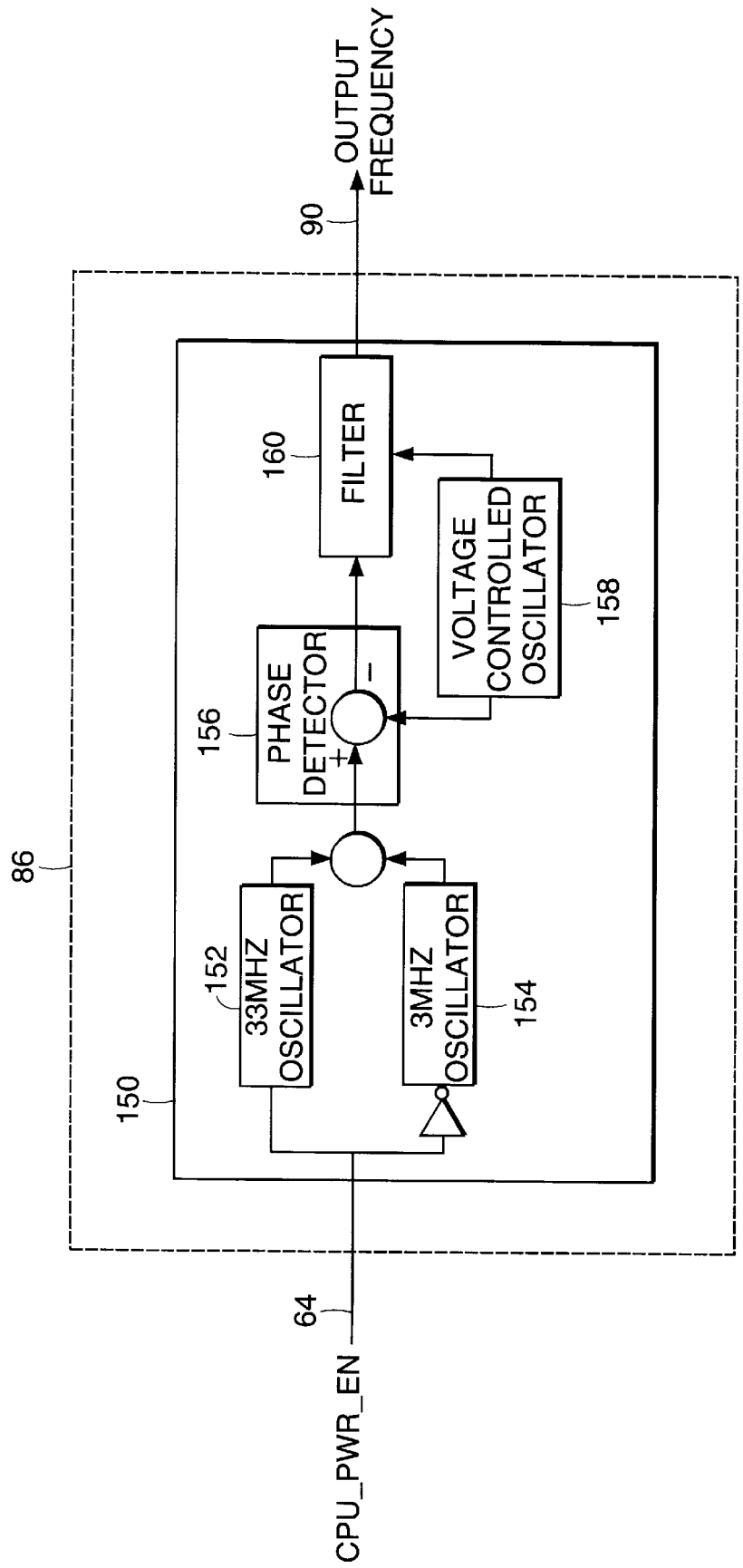
FIG. 4 depicts the internal circuitry of Frequency Generator 86 of FIG. 2 for reducing its output frequency.

Referring to FIGS. 2b and 4, an alternative embodiment is shown wherein signal line CPU_PWR_EN 64 is coupled to a frequency generating unit 86. Frequency Generator 86 includes logic for shutting the CPU clock frequency off or sufficiently reducing it, when signal CPU_PWR_EN is de-asserted. Referring to FIG. 4, the frequency generating unit 86 is shown to be a Phase Locked Loop (PLL) device. The state of signal line CPU_PWR_EN 64 enables either 33 Mhz oscillator 152 or 3 Mhz oscillator 154, the output of which is forwarded to Phase Detector 156. Phase Detector 156 differences the input frequency with the output of Voltage Controlled Oscillator (VCO) 158 and generates an error signal. The error signal is forwarded to the Filter 160 which drives VCO 158 with a correction signal that synchronizes the output of the VCO with the input frequency.

Therefore, PLL 150 varies the frequency of output signal 90 from 33 Mhz when signal CPU_PWR_EN is asserted, to 3 Mhz when signal line CPU_PWR_EN 64 is deasserted. When signal line CPU_PWR_EN 64 is asserted, the frequency of output signal 90 allows CPU 12 to operate normally. However, when signal line CPU_PWR_EN 64 is deasserted and the frequency of output signal 90 is reduced to 3 Mhz, CPU 12 cannot execute instructions and is therefore in the low power consumption mode of operation.

It should be noted that although many CPU devices are prevented from executing instructions when running at such a reduced frequency, some CPU devices can execute instructions although in a significantly reduced capacity. Accordingly, even in this type of CPU device, power consumption decreases significantly with reduced clock frequency and therefore constitutes a low power consumption mode of operation.

It will be recognized by one of ordinary sill in the art that the disclosed embodiment for reducing the output frequency is merely one of many methods for reducing the operating frequency supplied to CPU 12. Accordingly this example is not meant to limit the disclosure to this one embodiment but rather to give one example for reducing supply frequency to CPU 12 in response to a control signal.

Figure 2C:
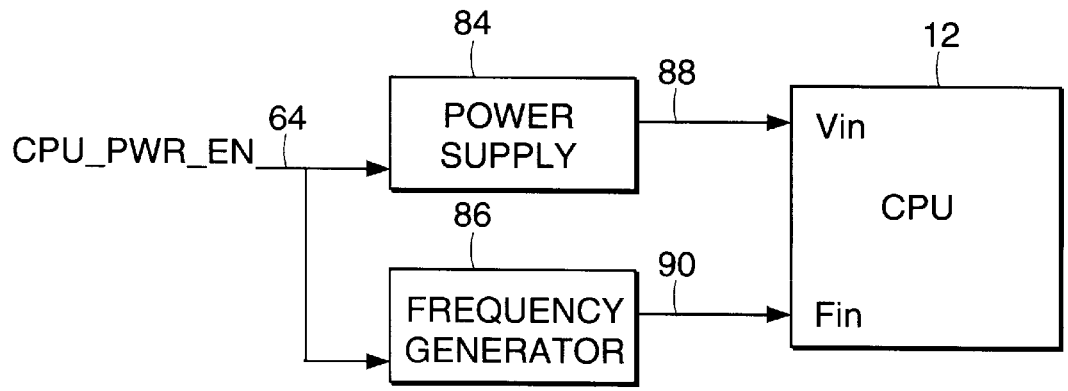

In this manner CPU 12 is prevented from executing instructions at full speed and is therefore placed into a low-power consuming mode. When the clock frequency is shut off, a problem arises wherein significant power may still be consumed based upon internal gates being at indeterminate states. For example, if a pull-up transistor array and the corresponding pull-down transistor array is turned on at the same time, significant DC current will be drawn by the circuit. In CPUs where this problem arises, it is necessary to provide a minimum frequency to the device such that control signals maintain a minimum level of functionality. A further solution is that such a CPU can use the CPU_PWR_EN signal to place the components that produce this problem into a known state As shown in FIG. 2c, it is further possible to reduce both the power supply voltage (generated by 84) and the clock frequency (generated by 86) provided to CPU 12, using the methods specified above, in order to reduce power consumed by the CPU device.

Referring now to FIG. 5, the operating system is depicted as one of a plurality of layers of software running on computer system 10 of FIG. 1. The software layers are shown to include a Privileged Architecture Layer (PAL code) layer, an optional Hardware Abstraction layer (HAL code), and an Operating System layer (OS).

In the computer system 10 of FIG. 1, the PAL code is capable of controlling system functions such as process context switching, interrupt handling, exception handling, and memory management operations. The HAL code layer provides a hardware specific interface between the PAL code that can rum on many systems and the generic operating system software.

The operating system is comprised of a plurality of portions, each of that is specialized to perform a specific task. Each operating system portion is comprised of a program including many instructions constructed in a sequenced order for the purpose of guiding the computer system in performing a specified task. In its most basic form, when central processing unit 12 executes such a program it fetches an instruction from memory, stores the location of the next sequential instruction in the program counter, manipulates the data as instructed, stores the results, and fetches the next instruction. It should be noted that in a more advanced form, many instructions are fetched from memory and executed at the same time.

In prior inventions, operating system software has included portions, referred to as wait instructions, that stop the CPU from executing instructions. Such operating systems allow the CPU to remain in this operating mode until any system interrupt assertion occurred. Assertion of an interrupt would then cause the CPU to begin executing instructions again.

In the present invention, a new type of wait instruction is implemented as part of the operating system PAL code described above. The new instruction is referred to as WT_INT. When a program executes the "CALL_PAL (WT_INT, INT_TIME)" instruction, it is specifying execution of the WT_INT instruction that is a portion of the operating system PAL code layer. The calling program also passes a variable, referred to as INT_TIME, that identifies the desired maximum amount of time that the CPU should stop executing instructions. Based on the actual amount of time that the program selects, the corresponding value of the INT_TIME variable is calculated by the calling program using equation (1) below:

INT_TIME=(system clock period÷interval clock interrupt period)×(Desired #of interval clock periods for CPU to stop executing instructions)     (1)

Equation (1) calculates the desired period of time for the CPU to operate in a low-power consuming mode, in relation to the system clock period. The reason for this conversion in the preferred embodiment, is because the logic comprising the CPU Interface Chipset 50 includes a counter that increments based on assertions of system clock signal 78. However, it should be noted that a person of ordinary skill in the art could implement a counter that merely counts the number of interval clock interrupt assertions. In that case the desired maximum amount of time for the CPU to operate in the low-power consuming mode would be specified in terms of the number of interval clock interrupt assertions and the conversion equation would therefore be unnecessary.

After the CPU has been placed in the low-power consuming mode of operation, the counter 60 counts the number of system clock periods (or alternatively the number of interval clock interrupts) that are asserted. If the counter reaches the count calculated by equation 1 (or alternatively the number of interval clock interrupts) before a non interval clock interrupt is asserted, the CPU is restored to normal power consuming operation by the assertion of signal line CPU_PWR_EN 64.

While CPU 12 is in the low-power consuming mode, or sleep period, CPU Interface Chipset 50 monitors the activity on all system interrupt signals. CPU Interface Chipset 50 includes storage locations for recording that interrupts were asserted during the sleep period. If an interrupt other than the interval clock interrupt is asserted during the sleep period, CPU Interface Chipset 50 asserts signal CPU_PWR_EN. CPU 12 is then returned to normal operation.

Because of the time lag between the assertion of signal CPU_PWR_EN and the actual rise of the CPU's supply voltage level or CPU clock frequency to a normal operating level, CPU Interface Chipset 50 continues storing system interrupt assertion information until CPU 12 returns to normal operation.

When CPU 12 resumes executing instructions, CPU Interface Chipset 50 presents the stored interrupt assertions to the CPU and the WT_INT PAL code returns the actual time, or the number of skipped interval clock ticks that represents the actual time, that CPU 12 was in the low-power consuming mode to the operating system. In this manner, all stored interval clock interrupts are delivered to CPU 12 that results in the updating of the current time representation. Accordingly, unlike prior implementations, Central Processing Unit 12 can remain in a low-power state for a longer period of time since it does not resume execution of instructions each time the interval clock interrupt is asserted.

In an alternative embodiment, CPU Interface Chipset 50 selectively monitors the activity on all system interrupt signals. If a specified interrupt other than the interval clock interrupt, is asserted more than a predefined number of times during the sleep period, CPU Interface Chipset 50 asserts signal CPU_PWR_EN. This embodiment can be extended to a group of specified system interrupts each having a predefined number of assertions that, when exceeded, cause the CPU Interface Chipset 50 to asserts signal CPU_PWR_EN.

Figure 6:
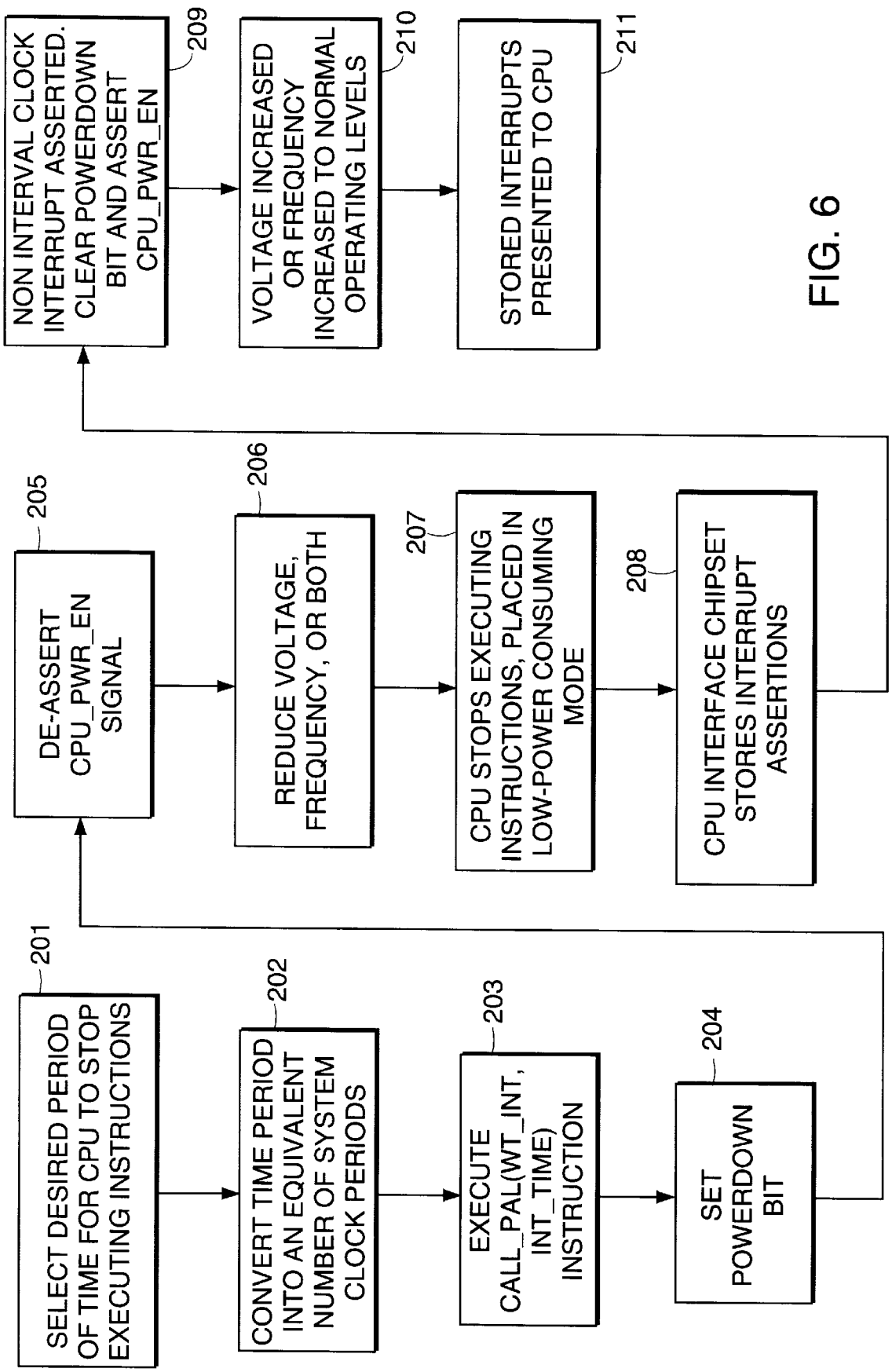
FIG. 6 depicts a flow diagram of a method for skipping clock interrupts for inactive systems that can be used on the computer system of FIG. 1.

Referring now to FIG. 6, a flow diagram is shown depicting the operation of the method for skipping interval clock interrupts described above. The method begins by selecting a desired period of time, specified in terms of the number of interval clock interrupt assertions, for the CPU to stop executing instructions (Step 201). The time period is chosen based on the operating characteristics of the particular computer system and the operating characteristics of the software that executes on the computer system, for example the amount of time until the next software scheduled event. Once the time period is chosen, the software performs a conversion calculation that converts the number of interval clock interrupt assertions into an equivalent number of system clock periods (Step 202). The CPU executes the CALL_PAL(WT_INT, INT_TIME) instruction specifying the execution of the WT_INT instruction and the chosen period of time (Step 203). When the CALL_PAL(WT_INT, INT_TIME) instruction is executed, the value of the INT_TIME variable is deposited in Timer-Alarm register 62 that is located in the CPU Interface Chipset 50. The WT_INT instruction next sets the POWERDOWN bit storage location 82 that is also located in the CPU Interface Chipset 50 (Step 204). Responsive to the POWERDOWN bit 82, logic circuits in the CPU Interface Chipset 50 de-assert signal CPU_PWR_EN that is connected to the CPU power supply, the frequency generator, or both (Step 205). Depending on the implementation, the de-assertion of CPU_PWR_EN signals the CPU power supply 84 to reduce its output voltage and/or signals the clock generator 86 to reduce its output frequency. When the power supply voltage and/or frequency are reduced (Step 206), Central Processing Unit 12 will stop executing instructions or operate at a greatly reduced speed and transition into a low-power consuming state (Step 207).

While the CPU is in this low-power consuming mode, logic in the CPU Interface Chipset 50 stores the interval clock interrupt assertions and all other system interrupt assertions (Step 208). The CPU Interface Chipset 50 continues to store interrupt assertions and the CPU remains in the low-power consuming mode until either a non-interval clock interrupt is asserted, the specified sleep time period has completed, or some other system status arises. At this point the CPU Interface Chipset 50 responds by deasserting POWERDOWN bit 82 and asserting the CPU_PWR_EN signal to the CPU power supply (Step 209). Assertion of signal CPU_PWR_EN causes power supply 84 to increase its output voltage and/or causes clock generator unit 86 to increase its output frequency to the CPU's normal operating level (Step 210). When normal CPU operation is regained, CPU Interface Chipset 50 forwards the stored interrupt assertions to the CPU (Step 211).

The method for skipping interval clock interrupts is rather specified using the following pseudo code listing, that depicts a typical WT_INT instruction:

```
If (hardware provides power saving features) then
begin
    if (hardware support for skipping interval clock interrupts)
    then
        1.  Setup hardware to skip desired number of clocks;
        2.  Transition CPU to low-power consumption mode;
        3.  Wait for any non-interval clock interrupts;
        4.  Wait for hardware to reach normal power consumption
            mode;
        5.  Update CPU with number of interval clock interrupt
            assertions actually skipped and with any other interrupts
            that were asserted during return to normal power consump-
            tion mode;
    Endif
Endif
```

When the WT_INT instruction is called, it checks the hardware to determine if it is capable of implementing power saving features. For example, the software checks for the presence of a power supply having the capability of reducing its output voltage or a frequency generator capable of reducing its output frequency. The instruction then checks to see if the hardware can support the present invention for skipping interval clock interrupts while the CPU is not executing instructions. If the present invention is supported, the WT_INT instruction initializes the CPU Interface Chipset 50 to stop execution for the desired time period by writing to the timer-alarm register 62 and then de-asserts the CPU_PWR_EN signal to reduce the supply voltage, operating frequency or both. The instruction waits to assert the CPU_PWR_EN signal until either the desired time period expires, a non-interval clock interrupt asserts, or some other event that requires immediate CPU attention occurs. Next, the CPU transitions back to normal operating mode and the CPU is updated with the number of interval clock interrupts that actually asserted, and with the other interrupts that asserted during the time period when CPU 12 was returning to normal power consumption mode.

This invention allows a computer system that is left powered on for an extended period of non-use or that is used sporadically, to reduce the operation of its most power consuming component, the central processing unit 12. Therefore, by allowing the Central Processing Unit to transition to a low-power consumption mode for extended periods of time, significant amounts of unnecessary power consumption can be conserved.

The method of the present invention may be extended to the individual Central processing Units of a multiprocessor computer system. In such an embodiment, the power conservation methods described above can be implemented for each CPU. Accordingly, an individual CPU can be placed into the low power consumption mode when it is inactive, for example when it is not needed to perform a current operation. Such an embodiment has the further advantage of reducing traffic and increasing performance because non-busy CPUs are kept off the bus.

Having described a preferred embodiment of the invention, it will now become apparent to one of ordinary skill in the art that other embodiments incorporating its concepts may be used. It is felt, therefore, that this embodiment should not be limited to the disclosed embodiment, but rather should be limited only by the spirit and scope of the appended claims.

What is claimed is:

1. A method for decreasing power consumption in a computer system, comprising the step of:

placing a central processing unit of the computer system in a low power consumption mode for a selectable duration;

counting assertions of a predetermined interrupt signal for measuring the selectable duration while said central processing unit is in said low power consumption mode; and returning said central processing unit to normal power consumption mode when either said counting step counts a predefined number of said assertions of said predetermined interrupt signal or when one or more system interrupt signals, other than the predetermined interrupt signal, are asserted.

2. The method for decreasing power consumption in a computer system as recited in claim 1, wherein said predetermined interrupt signal is an interval clock interrupt signal.

3. An apparatus for decreasing power consumption in inactive systems, comprising:

a central processing module, including a central processing unit, coupled to a voltage generator and a frequency generator;

means for placing said central processing unit into a low power consumption mode of operation for a selectable duration;

means for counting assertions of a predetermined interrupt signal to measure the selectable duration during the time period when said central processing unit operates in said low power consumption mode; and means for returning said central processing unit from said low power consumption mode.

4. The apparatus for decreasing power consumption in inactive systems, as recited in claim 3, wherein said means for returning said central processing unit from said low power consumption mode is responsive to:

means for indicating an equivalency between a predetermined time for said central processing unit to operate in a low power consumption mode and an elapsed time since said central processing began operating in a low power consumption mode, and means for indicating the assertion of an interrupt signal other than the predetermined interrupt signal.

5. The apparatus for decreasing power consumption in inactive systems, as recited in claim 4, wherein said means for indicating an equivalency further comprises a timer-alarm register for representing a time period for said central pressing unit to operate in a low power consumption mode;

a counter circuit, coupled to said timer-alarm register and to a clock, including means for counting responsive to said clock; and means for comparing the contents of said alarm register with the output of said counter circuit for indicating equivalency between said contents of said alarm register and said output of said counter circuit.

6. The apparatus for decreasing power consumption in inactive systems, as recited in claim 3, further comprising:

means for asserting a signal line responsive to said means for counting assertions determining the selectable duration has expired.

7. The apparatus for decreasing power consumption in inactive systems, as recited in claim 6, further comprising:

means for delivering said counted number of assertions of said predetermined interrupt signal to said central processing module.

8. The apparatus for decreasing power consumption in inactive systems, as recited in claim 7 wherein said predetermined interrupt signal is an interval clock interrupt signal.

9. A method for decreasing power consumption in inactive systems comprising the steps of:

depositing a representation of a period of time for a central processing unit to operate in a low-power consumption mode for a selectable duration, into a timer-alarm register;

resetting a counter circuit that counts synchronous to a clocking signal;

deasserting a signal line coupled to a generator, said generator further coupled to said central processing unit and including means for reducing an output in response to said deassertion of said signal line;

counting assertions of a predetermined interrupt signal to measure the selectable duration until a terminating event occurs and until said central processing unit returns from said low-power consumption mode; and asserting said signal line coupled to said generator when said terminating event occurs.

10. The method of claim 9 wherein said generator is a frequency generator and said output of said generator is a frequency signal.

11. The method of claim 9 wherein said generator is a voltage generator and said output of said generator is a voltage signal.

12. The method of claim 9 wherein said terminating event is an assertion of an interrupt signal other than the interval clock interrupt.

13. The method of claim 9 wherein said terminating event is where the output of said count of assertions of said interval clock interrupt is equal to said representation of said period of time.

14. The method of claim 9 wherein said predetermined interrupt signal is an interval clock interrupt signal.

15. The method of claim 9 wherein said central processing unit continues to execute instructions while in said low-power consumption mode.

16. The method of claim 9 wherein said representation of a period of time for a central processing unit to operate in a low-power consumption mode is calculated by an operating system that exports said representation via a first software layer, said first software layer translating said representation to a central processing unit specific representation responsive to a type of said central processing unit.

17. A method for decreasing power consumption in a computer system, comprising the steps of:

placing a central processing unit of the computer system in a low power consumption mode for a selectable duration;

counting assertions of a predetermined interrupt signal to measure the selectable duration; and returning said central processing unit to normal power consumption mode when either a predetermined time period for said central processing unit to operate in the low power consumption mode has expired or when one or more interrupt signals other than the predetermined interrupt signal, each having a predetermined assertion limit, is asserted in excess of the limit.

18. A method for decreasing power consumption of a computer system, comprising the steps of:

communicating a representation of a selectable duration, for a central processing unit to operate in a low power consumption mode for the selectable duration, from an operating system layer of software to a storage location in said computer system;

placing said central processing unit on the computer system in the low power consumption mode for the selectable duration;

counting assertions of a clocking signal; and returning said central processing unit to normal power consumption mode when either the selectable duration for said central processing unit to operate in the low power consumption mode has expired or when one or more system interrupt signals is asserted.

19. The method of claim 18 wherein a representation of an actual period of time that said central processing unit remains in said low power consumption mode is communicated back to said operating system.

20. The method of claim 18 wherein said storage location is a register in said computer system.

21. The method of claim 18 wherein said storage location is an input variable to another layer of software.

\* \* \* \* \*